May 19, 1970 — J. LAW — 3,512,901
MAGNETICALLY COUPLED PUMP WITH SLIP DETECTION MEANS
Original Filed July 28, 1967 — 2 Sheets-Sheet 1

INVENTOR.
JOHN LAW.
BY Frank N. Decker Jr.
ATTORNEY.

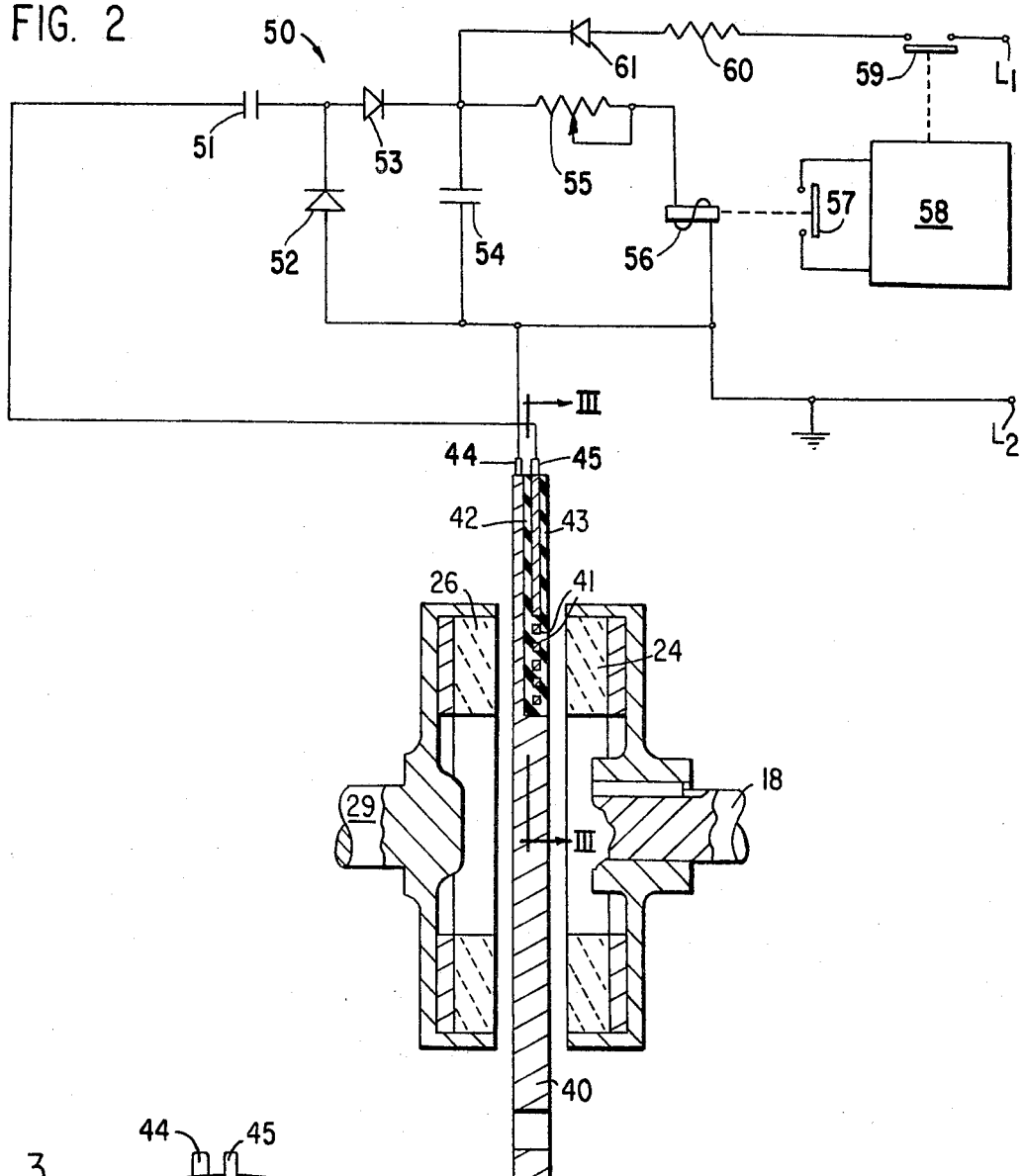
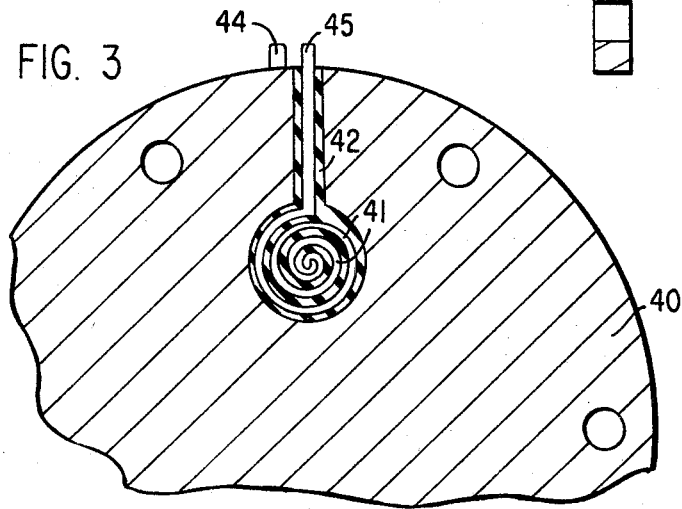

United States Patent Office 3,512,901
Patented May 19, 1970

3,512,901
MAGNETICALLY COUPLED PUMP WITH SLIP DETECTION MEANS
John Law, Manlius, N.Y., assignor to Carrier Corporation, Syracuse, N.Y., a corporation of Delaware
Original application July 28, 1967, Ser. No. 656,851, now Patent No. 3,429,137, dated Feb. 25, 1969. Divided and this application Sept. 6, 1968, Ser. No. 757,975
Int. Cl. F04d 13/02
U.S. Cl. 417—53
5 Claims

ABSTRACT OF THE DISCLOSURE

A magnetic drive pump for use in an absorption refrigeration system, having coil disposed intermediate rotating drive and follower magnets for sensing resulting variation in the magnetic flux linking the coil to provide a control signal indicative of loss of magnetic coupling.

CROSS REFERENCE TO RELATED APPLICATION

This application is a division of my co-pending application Ser. No. 656,851, filed July 28, 1967, now Pat. No. 3,429,137.

BACKGROUND OF THE INVENTION

This invention relates to a method and device for determining loss of magnetic coupling between magnetic drive and driven members, and more particularly to a magnetic drive pump for use in an absorption refrigeration system.

In absorption refrigeration systems utilizing an absorbent such a mixture of water and lithium bromide as an absorbent solution and water as a refrigerant, separate circulation of absorbent and refrigerant fluids is commonly effected by means of a pump having hermetically sealed impeller chambers at opposite ends of the pump motor. The pumps may desirably be magnetically coupled to the motor to obtain such fluid circulation.

The present invention is applicable to absorption refrigeration systems employing magnetic driven pumps. In such a pump the driving motor is coupled to an impeller encased in a hermetically sealed housing by magnetic coupling through a non-magnetic diaphragm between permanent magnets affixed to the motor and the impeller to effect synchronous drive. If the driven magnet "slips" or falls out of synchronism with the drive magnet in synchronous magnetic drives, the coupling is lost and cannot be restored until the drive and driven magnets are stopped. When slip occurs, the impeller stops even though the drive motor continues to run. This can present an undesirable situation which may result in over-concentration of the absorbent solution or possibly solidification of absorbent.

Heretofore, a method of sensing slip has been to monitor motor current which decreases when slip occurs in the coupling. Motor current, however, is additionally a function of individual motor characteristics, line voltage and variations in load, and consequently, these additional factors present problems affecting the accurate detection of slip.

Accordingly, it is an object of this invention to provide an improved absorption refrigeration system having a magnetic drive pump for circulating the system fluids.

It is a further object to obtain improved control of magnetic drive pumps in absorption refrigeration systems.

SUMMARY OF THE INVENTION

The present invention is directed to a magnetic pump coupling having means which functions to detect the occurrence of loss of magnetic coupling by sensing a variation in the magnetic flux pattern intermediate drive and driven magnets in the magnetic drive pump and associated circuitry to de-energize the pump motor, whereby the motor can come to a stop and permit the magnetic coupling to become re-established.

In accordance with a preferred embodiment of this invention, an absorption refrigeration system including an evaporator, absorber, generator, condenser, and a magnetic drive rotary pump for circulating fluids in the system, is provided with a magnetic sensing device for determining loss of magnetic coupling between the pump drive magnet and driven magnet. Circuitry is provided for controlling the refrigeration system pump by de-energizing the pump motor when coupling is lost to automatically regain the coupling.

BRIEF DESCRIPTION OF THE DRAWINGS

FIG. 2 is a schematic diagram of a magnetic flux sensing detector circuit embodying the present invention, including a simplified view showing the magnetic drive and magnetic flux sensing coil arrangement; and FIG. 3 is an enlarged sectional view taken along line III—III of FIG. 2 showing the magnetic flux sensing coil.

DESCRIPTION OF THE PREFERRED EMBODIMENT

Figure 1:
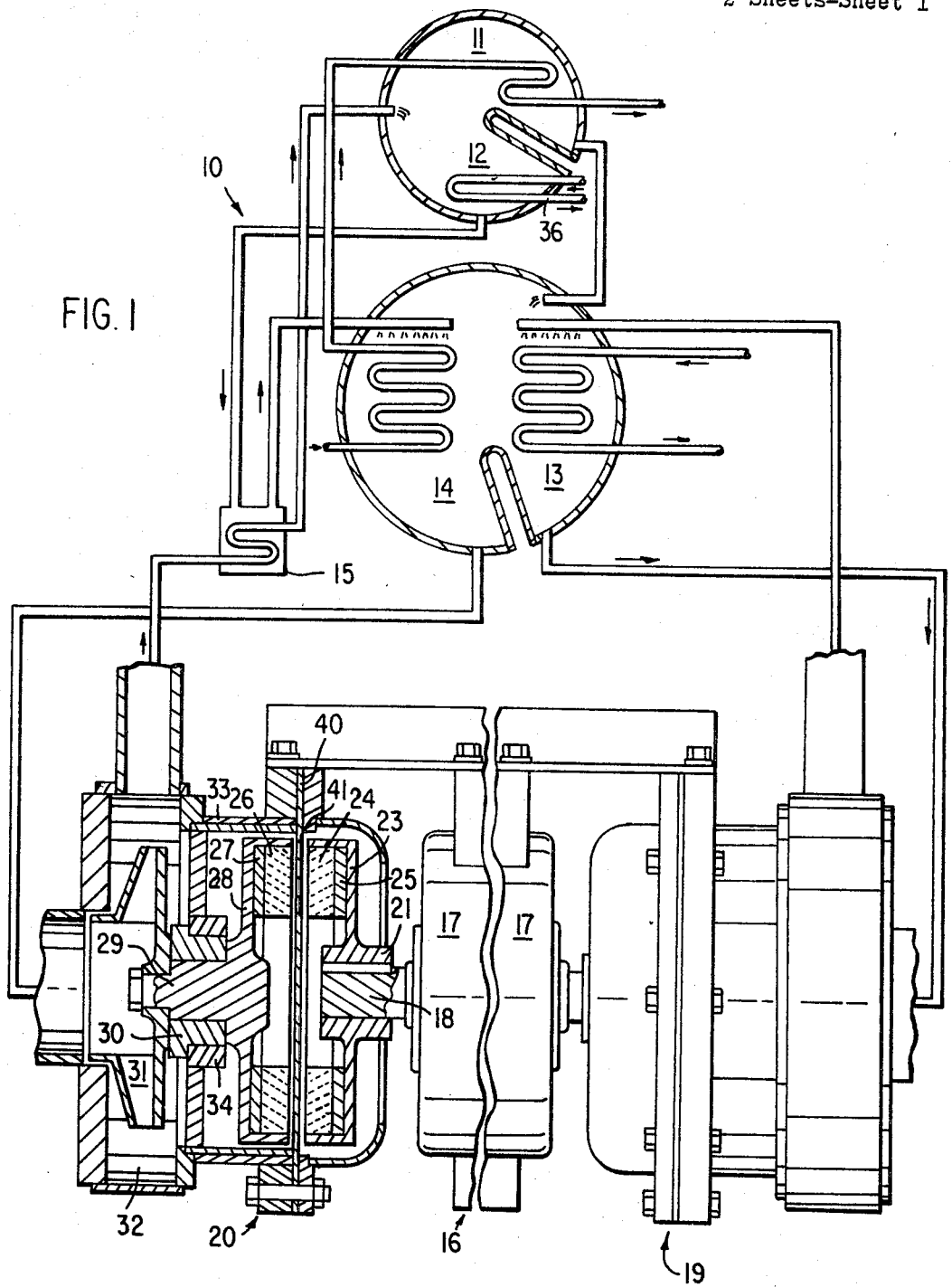
FIG. 1 illustrates a diagrammatic view of a basic absorption refrigeration system including a partial cross sectional view of the magnetic pump coupling of the present invention.

Referring particularly to FIG. 1, there is shown diagrammatically a basic absorption refrigeration system 10 suitable for practicing the present invention. The system includes condenser 11, generator 12, evaporator 13, absorber 14, heat exchanger 15 and a magnetically driven dual pump 16 connected to provide refrigeration.

Dual pump 16 comprises hermetic refrigerant pump 19, hermetic solution pump 20 and pump motor 17. Weak absorbent solution, such as a solution of lithium bromide and water is forwarded by solution pump 20 from absorber 14, through heat exchanger 15 to generator 12 where the refrigerant is boiled off to concentrate the absorbent solution. The heated strong absorbent solution is returned to absorber 14 through heat exchanger 15 in heat exchange relation with the weak solution. Refrigerant vapor boiled off in generator 12 is condensed in condenser 11 and the liquid refrigerant is then passed to evaporator 13. Unevaporated refrigerant accumulated at the bottom of evaporator 13 is recirculated by refrigerant pump 19 and returned to evaporator 13 for evaporation to provide a cooling or refrigeration effect for supplying a refrigeration load. The refrigerant vapor from evaporator 13 is absorbed by strong absorbent solution in absorber 14, forming a weak absorbent solution.

As shown in FIG. 1, pump motor drive shaft 18 is keyed to hub 22 which has a cup-shaped flange 23 formed thereto. Secured within flange 23 is a toroidal shaped radial drive magnet 24 that has a number of alternate north and south pole radially-extending magnetized areas and magnetic backing plate 25. Radial driven magnet 26 is similar to radial drive magnet 24 and is axially aligned opposite radial drive magnet 24 and mounted in face opposing relationship with a small separation gap therebetween. Driven magnet 26 and backing plate 27 are secured in cup-shaped flange 28 which is formed with impeller shaft 29. Bearing 30 suitably affixed to pump housing 34 is provided for journaling impeller shaft 29. Contained within housing chamber 32 is an impeller 31 which is affixed to impeller shaft 29 for propelling fluid. Non-magnetic diaphragm 40, which is mounted on casing 33 in the small gap between drive and driven magnets 24, 26, serves as an end closure hermetically sealing the driven magnet-impeller portion from the drive-magnet motor portion of solution pump 20. Refrigerent pump 19 is similar to the construction of solution pump 20 differing only in function in the refrigeration system.

Diaphgram 40 is composed of a rigid non-magnetic metallic material, such as the iron-nickel alloy known as Iconel, so as not to short circuit the magnetic flux path from driven to drive magnets 26, 24 and to reduce eddy current losses which reduce the torque transmitting capability of the coupling.

Referring to FIG. 2, an enlarged simplified view is shown to illustrate the arrangement of diaphragm 40, drive magnet 24 and driven magnet 26. Supported by diaphragm 40 is a magnetic sensing coil 41. In the preferred embodiment, as shown in FIGS. 2 and 3, magnetic sensing coil 41 is of the printed circuit type, formed according to any well known method on an electrically insulative substrate 43 that is impervious to a solution of water and lithium bromide. In order to permit arranging drive and driven magnets 24, 26 with a minimum gap therebetween and avoid physical contact with diaphragm 40, it is desirable to form magnetic sensing coil 41 within a recessed portion of diaphragm 40 so as to be level with the surface of the diaphragm. The center terminus of printed circuit coil 41 is soldered directly to the diaphragm 40. Thus diaphragm 40 serves as one connection to the coil through terminal 44. A second terminal 45 connects to the other end of coil 41. As shown in FIG. 2, magnetic sensing coil 41 is positioned to intercept magnetic flux intermediate rotating drive and driven magnets 24, 26.

The operation of magnetic flux sensing coil 41 and its associated detector circuit 50, as shown in FIGS. 2 and 3, will now be considered. Under normal operating conditions with contacts 59 open and with drive and driven magnets 24, 26 rotating synchronously, a sinusoidal voltage is induced in magnetic sensing coil 41 from the effect of the motion of magnetic flux relative to coil 41 causing a time varying flux linking the coil. This induced sinusoidal voltage appearing at output terminals 44 is applied to a voltage doubler comprising capacitor 51, diode 52, diode 53 and capacitor 54. The doubler output is then passed to relay coil 56 through variable resistor 55. The voltage is sufficient to hold normally open relay contacts 57 closed (after they have been initially closed by other means as described below) when drive and driven magnets 24, 26 are synchronized and running. The function of relay contacts 57, connected to the motor energizing circuit of absorptions refrigeration system control circuit 58, is to interrupt the pump motor energizing circuit when slip is detected by circuit 50 and the voltage in relay coil 56 falls below the normal operating level.

On start-up of absorption refrigeration system 10, time delay contacts 59 are closed connecting detector circuit 50 to line A.C. voltage source $L_1$, $L_2$. Half-wave voltage excitation from rectifier diode 61 and through resistor 60, which are series connected with time delay contacts 59, is applied to relay coil 56 when time delay contacts 59 are closed, through variable resistor 55, thereby closing contacts 57. Time delay contacts 59 open after a suitable, preferably five second delay, in this particular system, which is sufficient for synchronous drive and driven magnets 24, 26 to reach running speed and thereby provide a voltage in coil 41 and through circuit 50 to continue holding relay contacts 57 closed after contacts 59 open.

As earlier mentioned, synchronous magnetic dual pump 16 is subject to loss of coupling or "slip" due to various causes such as impeller overload and electric power transients. During synchronous rotation of drive and driven magnets 24, 26 magnetic flux linking each magnetic pole of the normally running radial magnets 24, 26 links sensing coil 41 intermediate the magnets at a sinusoidal rate of change of flux linkage and thus induces a sinusoidal voltage therein. When slip occurs and driven magnet 26 stops rotating, the rate of change of magnetic flux linking sensing coil 41 will be reduced by a factor of two because of the new flux condition existing in the gap between the magnets. This is observed regardless of the relative position of sensing coil 41 with respect to stopped driven magnet 26. This flux variation is such that a sinusoidal voltage of one-half the peak-to-peak magnitude as induced in magnetic sensing coil 41 under normal synchronous running conditions will now appear at coil output terminals 44, 45. With the induced voltage reduced, the voltage applied to relay coil 56 is insufficient to hold relay contacts 57 closed, and when relay contacts 57 open, pump motor 17 is de-energized and stops. In practice, it is found desirable to include within system control circuit 58, control circuitry responsive to sensing coil 41 output for shutting off the heating medium supplied to generator heat exchanger 36 upon the occurrence of slip in order to prevent over-concentration and possible solidification of absorbent solution. Variable resistor 55 is adjustable for setting the drop out voltage for contacts 57 according to the sensitivity of relay coil 56.

Magnetic flux detector circuit 50 as shown in FIG. 2 is connected to a single magnetic flux sensing coil 41. It should be noted that if it is desired to sense slip in both pump sections of dual pump 16, two magnetic sensing coils, one on each diaphragm 40, can be used in series or as dual inputs to a modified detector circuit, or as separate inputs to separate detector circuits.

While a preferred embodiment of this invention has been described for purposes of illustration, it will be understood that other electrical circuitry may be used to obtain the control functions described herein. It will be further understood that other types of magnetic flux sensors may be employed at other locations on the magnetic coupling for sensing loss of coupling. Also, it is contemplated that automatic control circuitry may be incorporated for automatic restarting after stopping due to loss of coupling as described above.

While a preferred embodiment of the invention has been described, it will be appreciated the invention is not limited thereto since it may be otherwise embodied within the scope of the following claims.

I claim:
1. A magnetic drive pump comprising:
 (A) a motor;
 (B) a magnetic drive member connected to the motor for rotational motion therewith;
 (C) an impeller;
 (D) a magnetic driven member connected to the impeller and mounted for rotational motion with said magnetic drive member;
 (E) an open ended housing enclosing said impeller and magnetic driven member;
 (F) a non-magnetic diaphragm intermediate said magnetic drive and magnetic driven members, said diaphragm secured to and closing the open end of said housing; and
 (G) magnetic flux sensing means disposed intermediate the rotatable magnetic drive member and rotatable magnetic driven member for sensing variation in the rate of change of magnetic flux intermediate the rotating magnetic drive member and magnetic driven member, said magnetic flux sensing means providing a control signal when the rotation of the driven member loses synchronous rotation with the drive member.

2. A magnetic drive pump as defined in claim 1 wherein said magnetic flux sensing means is an electrical coil for providing an electrical control signal for indicating the loss of synchronous rotation.

3. A magnetic drive pump as defined in claim 2 wherein said electrical coil is a printed circuit coil.

4. A magnetic drive pump as defined in claim 2 wherein said electrical coil is supported on the non-magnetic diaphragm adjacent said magnetic drive member.

5. A method of controlling a magnetic drive pump having an electric motor, a control circuit connected to the motor, a magnetic drive member attached to the motor for rotatable motion therewith, an impeller and a magnetic driven member attached to the impeller and mounted for rotational motion with the magnetic drive member, comprising the steps of
- (A) energizing the pump motor for imparting synchronous motion energy to the pump impeller by a magnetic coupling force between the magnetic drive member and magnetic driven member;
- (B) sensing variations in the magnetic flux intermediate the rotating magnetic drive member and magnetic driven member and providing a control signal indicative of loss of synchronous rotation with the magnetic drive member; and
- (C) detecting the control signal and de-energizing the motor upon detecting loss of magnetic coupling to regain magnetic coupling between the magnetic drive member and magnetic driven member.

References Cited

UNITED STATES PATENTS

| | | | |
|---|---|---|---|
| 821,673 | 5/1906 | Richards | 230—15 |
| 3,332,252 | 7/1967 | Miller et al. | 62—476 |

ROBERT M. WALKER, Primary Examiner

U.S. Cl. X.R.

310—104; 417—63, 420